United States Patent [19]

Bulgrin

[11] Patent Number: 5,456,870
[45] Date of Patent: Oct. 10, 1995

[54] BARREL TEMPERATURE STATE CONTROLLER FOR INJECTION MOLDING MACHINE

[75] Inventor: Thomas C. Bulgrin, Columbia Sta., Ohio

[73] Assignee: Van Dorn Demag Corporation, Strongsville, Ohio

[21] Appl. No.: 247,082

[22] Filed: May 20, 1994

[51] Int. Cl.$^6$ .............................. B29C 45/74; B29B 7/82
[52] U.S. Cl. .................................... 264/40.6; 264/211.21; 264/328.14; 425/143; 425/207; 425/550; 366/145; 364/477
[58] Field of Search .............................. 264/40.6, 211.23, 264/211.24, 349, 328.1, 328.14, 211.21; 425/143, 550, 144, 204, 208, 209, 207; 364/476, 477; 165/22, 903; 366/144, 145, 149

[56] References Cited

U.S. PATENT DOCUMENTS 5,397,515 3/1995 Searle ....................................... 366/145

OTHER PUBLICATIONS

*Computer Controlled Systems: Theory and Design*, Karl J. Astrom and Bjorn Wittenmark, 1990 Prentice–Hall, Inc., pp. 148–183.
*Heat Tarnsfer*, J. P. Holman, 1976 McGraw–Hill, Inc., pp. 123–135.
*Elementary Differential Equations and Boundary Value Problems*, William E. Boyce and Richard C. DiPrima, 1977 John Wiley & Sons, Inc., pp. 453–460 and 549–554.
*Digital Control System Analysis and Design*, Charles L. Phillips and H. Troy Nagle, 1990 Prentice–Hall, Inc., pp. 336–349.
*Digital Filters*, by AT&T, R. W. Hamming, 1989 Prentice–Hall, Inc., pp. 1–20.
*Numerical Methods for Partial Differential Equations*, William F. Ames, 1992 Academic Press, Inc., pp. 8–20.

*Primary Examiner*—Jill L. Heitbrink
*Attorney, Agent, or Firm*—Frank J. Nawalanic

[57] ABSTRACT

An improved temperature control system using a state controller with two degrees of freedom to regulate the temperature of the barrel of an injection molding machine is disclosed. The control system divides the temperature of the barrel into longitudinally-extending zones and radially extending layers within each zone. Heat transfer calculations which include the effects of heat transfer between all the layers within the zones are performed for a set time in the future to accurately determine the heat needed from the heater band to reach the operator set point temperature. The duty cycle for the heater bands is thus accurately set to give a more responsive and accurate control than heretofore possible. The controller additionally includes factors for accounting for heat disturbances present in the injection molding process. In addition each system is calibrated for each machine to insure accurate formulation of machine specific parameters such as heat transfer co-efficients used in the control.

21 Claims, 9 Drawing Sheets

BARREL TEMPERATURE STATE CONTROLLER FOR INJECTION MOLDING MACHINE

This invention relates generally to plasticating machines, and more particularly, to method, apparatus and a system for controlling the barrel temperature of injection molding machines.

While the invention has particular application to and will be described with specific reference to injection molding machines, those skilled in the art will appreciate that the invention has broader application and could be applied to extruders, die cast and like machines where the temperatures of a plastic or metal melt within a cylindrical barrel must be accurately controlled while the melt is forced through any type of opening.

INCORPORATION BY REFERENCE

The following general references and texts are incorporated by reference herein so that conventional techniques and practices known in the control art and heat transfer art need not be set forth in detail herein. The texts illustrate various concepts and principles, some of which are utilized in this invention but which do not, per se, and in and of themselves, form the invention.

*Computer Controlled Systems: Theory and Design*, second edition, by Karl J. Astrom and Bjorn Wittenmark, copyright 1984, 1990 by Prentice-Hall, Inc., pages 148–183.

*Heat Transfer*, fourth edition, by J. P. Holman, copyright 1963, 1968, 1972, 1976 by McGraw-Hill, Inc., pages 123–135.

*Elementary Differential Equations and Boundary Value Problems*, third edition, by William E. Boyce and Richard C. DiPrima, copyright 1965, 1969, 1977 by John Wiley & Sons, Inc., pages 453–460 and 549–554.

*Automatic Control Systems*, fifth edition, by Benjamin C. Kuo, copyright 1987 by Printice-Hall, Inc., pages 259–264 and 520–533.

*Numerical Recipes in C, The Art of Scientific Computing*, by William H. Press, Brian P. Flannery, Saul A. Teukolsky and William T. Vetterling, copyright 1988, 1989, published by the Press Syndicate of the University of Cambridge, pages 317–324 and 673–680.

*Digital Control System Analysis and Design*, second edition, by Charles L. Phillips and H. Troy Nagle, copyright 1984, 1990 by Prentice-Hall, Inc., pages 336–349.

*Digital Filters*, third edition, by AT&T, R. W. Hamming, copyright 1989 by Prentice-Hall, Inc., pages 1–20.

*Numerical Methods for Partial Differential Equations*, third edition, by William F. Ames, copyright 1969, 1977, 1992 by Academic Press, Inc., pages 8–20.

BACKGROUND

In injection molding machines a reciprocating screw within a cylindrical barrel pushes or injects a plasticized melt through an orifice at the barrel end or nozzle. The screw is then retracted in the barrel while rotated to advance new plastic material through the screw flights into the barrel space forward of the screw whereupon the injection stroke occurs again.

The temperature of the plastic melt from the feed hopper where the plastic material enters the barrel to the barrel nozzle where the plastic is injected to the mold must be carefully controlled. The control of the temperature of the plastic melt is affected by a number of factors. For example, the composition of the melt itself, the speed of rotation of the screw (shear heat), the temperature of the melt as it leaves the plasticating hopper, the speed of the ram during injection, etc. One of the factors influencing the temperature of the melt is the barrel heat. This invention relates to a control and a process for controlling the barrel temperature. Since the barrel temperature is one of the factors affecting the melt temperature, the invention relates somewhat to the melt temperature. However, the invention is not directed to any control, per se, of the melt temperature. The invention permits better control of one of a number of different elements of an injection molding machine, all of which cumulatively seek to give the operator a precise control of all variables in the molding process, one variable being the temperature of the melt.

Typically, control of the barrel temperature of an injection molding machine is achieved by electric heater coils or bands circumscribing the barrel and extending over discrete lengths of the barrel from the feed hopper to the barrel nozzle. Typically, four zones of heater bands are used, although many machines use three bands and some small machines have only two heater bands. Insofar as the machine's control console is concerned, present day controls give the operator the option of setting the barrel temperature for each heater band or zone to whatever temperature is desired depending on the characteristics of the plastic being molded. It should be appreciated that the injection stroke can be very rapid. Thus while the process is a batch process, rapidness of the cycle is such that the heater bands are simply turned "on" by a duty cycle throughout the entire plastic run of the machine. Current will simply pass through the resistance heating elements for a time regulated by a duty cycle and then be shut-off for a regulated time period. Because of the time it takes for heat to pass by conduction throughout the barrel, the bands are not purposefully adjusted during each molding cycle. However, each molding cycle will inherently produce temperature disturbances in the zones. This is one of the reasons why injection molding machines have more complex heat transfer problems than other similar systems which have steady-state characteristics such as extrusion processes.

Early controls for the heater bands were simple thermostat-like temperature switches and variacs. Such controls offered a manual mode for setting temperature of the bands without a thermocouple. However, such controls could not sense the temperature of the barrel and lacked any type of control which could account for any variation in the temperature of the plastic melt.

The most common control in use today is a P.I.D. controller implemented within the injection molding machine's main controller or through external temperature control modules. The typical installation uses a thermocouple embedded in the wall of the barrel for each heat band or zone. The thermocouple generates a closed loop feedback signal fed back to the P.I.D. controller, which also receives the temperature set point signal and generates a command, or driving signal, controlling the heater band duty cycle. The P.I.D. closed loop, feedback control system is commonly used in the control industry to calculate terms proportional to the error term, its integral and derivative, which are summed to achieve the controller output. Through proper selection of the gain terms, it may be "tuned" to solve a particular control problem and is viewed as being very "robust" in handling disturbances. However, the P.I.D. controller is a low order controller operating in accordance with classic feedback control concepts. Its disturbance response, steady state errors and peak overshoot must be compromised to arrive at a good set of "tuning" gain values which inherently, cannot accurately predict nor correct for higher order dynamics such as are present in a distributed parameter problem like heat conduction. As a general principle, the P.I.D. controller does not take into account any information about the process it is controlling. It simply reacts to feedback in a classical sense to correct an error.

Developments in the control art applied to temperature control of injection molding machines have, until now, taken the form of auto tuning or conceivably adaptive auto tuning of the P.I.D. feedback loop to arrive at a better selection of the gain term used in the P.I.D. loop, thus making the P.I.D. more responsive, etc. Fundamentally, this approach is defective because P.I.D. controllers are single in/single out controllers. The feedback law employed in single in/single out controllers does not take into account any information from the surrounding zones. Therefore, the controller must wait until the temperature effects of the surrounding zones travel through the barrel and are sensed by the thermocouple to generate sufficient feedback error at the zone for the closed loop to detect and respond to the error. This inherent deficiency or failure to account for temperature effects upstream and downstream of the zone translate into numerous control deficiencies experienced by the injection molding machine. One specific example of a deficiency in the P.I.D. controller is nozzle temperature overshoot due to an increase in the temperature in the front zone. Still more basic, zone temperature overshoot and ramp time to reach desired temperatures cannot be controlled by a P.I.D. controller to the extent that a controller could function if its gain term factored into account the temperature effects of the surrounding heat zones before the time lag occurs when such temperature effects are actually sensed. A control which doesn't rely then on feedback concepts to record an event which has occurred, but instead, estimates the occurrence of the event inherently then provides a significant improvement over prior art feedback control technology.

In the general control prior art, state controllers based on mathematical models utilizing state variables are known. Where disturbances in the system can be measured, it is known to reduce or compensate for the disturbances by means of feed forward (as contrasted to feedback). Where the disturbances cannot be measured, it is known to predict the disturbance using measurable signals and an observer incorporated into mathematical models based on various analysis, such as statespace or input-output. While theoretical discussions of control principles can be found in any number of text references (several of which are incorporated by reference herein), the practical incorporation of such concepts in high speed injection molding machines involving, among other things, numerous disturbances (many of which are not directly measurable), variations in barrel geometry, heat conduction coefficients, etc. has heretofore prevented the use of state controllers in injection molding machines.

SUMMARY OF THE INVENTION

Accordingly, it is a principle object of the invention to provide a state controller for regulating the temperature of heater bands in an injection molding machine which accurately predicts future temperature events and thus provides a more responsive control of barrel temperature than heretofore possible.

This object along with other features of the present invention is achieved in a process or control system automatically controlling the duty cycle for the heater bands of an injection molding machine to achieve an operator inputted set point temperature. The molding machine has at least three electrical heater bands with each band extending about the cylindrical barrel while longitudinally-extending, side-by-side along the barrel between the feed hopper and nozzle thus dividing the barrel into at least three longitudinally-extending zones, each zone associated with a heater band. The process includes the steps of a) dividing each zone into four radially extending layers including a heater band layer radially extending through the heater band, an outer surface layer radially extending from the outer barrel surface inwardly into the barrel, an inner surface layer radially extending from the inside surface of the barrel outwardly into the barrel and a middle layer in-between and contiguous with the outer and inner layers; b) predicting the temperature of the middle layer at the end of a first discrete time period into the future by simultaneously calculating the heat transferred from and to each layer in each zone by all other layers in all other zones during a first future time period; and c) adjusting the duty cycle for each zone to reduce the deviation between the predicted future temperature and the set point temperature to zero whereby the duty cycle more accurately reaches and maintains the set point temperature because the affect of the temperatures of all zones in the barrel are used to set the duty cycle in a feed forward manner.

In accordance with another aspect of the invention the method includes the additional step of predicting the future peak temperature of each middle layer occurring during a second future time period longer than the first time period by simultaneously calculating the heat transferred between all layers during the second time period but without considering any heat transferred to any of the layers by the heater bands and then calculating the heat needed to maintain the temperature at the future peak temperature which is added to the heat needed to reach the set point temperature to produce a signal controlling the duty cycle and thus the temperature of the heater band.

In accordance with another aspect of the invention, the process includes an additional step of providing a thermocouple to continuously sense the actual temperature of the middle layer which is then used in step (b) to predict the future temperature. Should any thermocouple fail an estimated temperature is provided for the middle layer based on the expected heat transfer from the heater band to the top zone layer and the process continues as if the thermocouple sensed the middle layer temperature but in a more accurate manner than heretofore possible so that failure of one or more or even all thermocouples in the barrel does not adversely affect any plastic run.

In accordance with another important feature of the invention, the temperature of the middle barrel layer is determined by calculating the heat transfer from or to each barrel layer by an immediately adjacent layer while ignoring the heat transfer effects from further removed barrel layers in any given iteration whereby the calculating time is reduced to permit a fast acting control but, in the overall temperature control, still considering the temperature impact of all zones on one another, while reducing the costs of the micro processor otherwise required to perform the calculations.

In accordance with yet another important feature of the invention, the process further includes a calibration step in which the duty cycle for the heater bands are operated in a predetermined sequence and step (b) is initially performed with hypothetical heat transfer co-efficients. By comparing the actual thermocouple readings with known temperatures, individual machine specific heat transfer co-efficients are obtained for use in step (b) to accurately predict the final future temperatures. Still more specifically a parametric estimation technique to develop a form fitting algorithm is utilized to develop accurate heat transfer co-efficients thereby making the estimated temperatures predicted by the control accurate and tailored for each individual machine.

In accordance with yet another specific feature of the invention, during operation, the predicted temperature is compared to the actual temperature recorded by the thermocouple at the middle layer after the future time has elapsed and the temperature of the inner layer is assigned a value sufficient to cause the predicted temperature of the middle layer to correspond to the actual temperature later recorded by the thermocouple. By attributing the difference to the inner layer, disturbances in the system attributed to the melt are more accurately accounted for than if the system were otherwise compensated.

In accordance with another aspect of the invention, an improvement is provided for an injection molding machine having a barrel, an injection screw within the barrel, a nozzle opening at one end of the barrel, a plastic feed hopper in fluid communication with the interior of the barrel spaced from the nozzle opening; and a plurality of heater bands, each band extending around the barrel and longitudinally spaced along the barrel between the nozzle opening and the feed opening to define a plurality of longitudinally-extending zones equal in number to the heater bands. The improvement includes an arrangement to automatically set the temperature of each band to reach and maintain the barrel at a set temperature including a) a thermocouple positioned in the barrel wall at each zone for developing a signal indicative of the barrel wall temperature for each zone; b) a first mechanism to generate for each thermocouple signal a set of four additional temperature signals indicative of the temperature within the outside surface layer of the barrel, the temperature within the inside surface layer of the barrel, the temperature within the heater element layer surrounding said band, and the temperature within the barrel wall mid-point layer by simultaneously calculating the heat transferred between any adjacent layer within a given zone and within an adjacent zone at any given time; c) a second mechanism to generate for each zone a single command signal based on predicted temperature indicative of the barrel wall mid-layer temperature of each zone at a specific time in the future utilizing the layer temperatures generated for each layer over a discrete future time period to produce the command signal; and d) a duty cycle mechanism for setting the current temperature of each heating band using the predictive command signal.

It is thus an object of the invention to provide a controller and/or control system regulating the temperature of heater bands in an injection molding machine which minimizes temperature overshoot.

It is another object of the invention to provide a controller and/or control system regulating the heater band temperatures of an injection molding machine to permit faster heating of the barrel with minimal temperature overshoot than that achieved with current control systems.

It is another object of the invention to provide a controller and/or control system for regulating the barrel temperature of an injection molding machine in which the individual barrel zones of the machine are more accurately controlled than heretofore possible.

It is a more specific object of the invention to provide a temperature control which utilizes feed forward and mathematical modeling techniques to better predict and regulate the barrel temperature of an injection molding machine.

It is yet another specific object of the invention to provide a controller for the barrel temperature of an injection molding machine which allows for future expansion of additional variables to better predict the temperature of the barrel should such expansion be desired.

It is still another object of the invention to provide an improved temperature controller for an injection molding machine which permits better visual display and monitoring of the injection process not only for the thermocouple barrel layer but also for other barrel layers to more quickly determine problems such as heater burn-out, deterioration or thermal runaway.

It is another object of the invention to provide a temperature control for an injection molding machine better regulating the melt temperature to permit:

i) molding of temperature sensitive materials;

ii) increase machine throughput; and/or iii) superior molded parts

Still another object of the invention is to provide a state controller for controlling the temperature of the melt in an injection molding machine.

It is another more specific object of the invention to provide a barrel temperature control for an injection molding machine which utilizes a method for calculating the future temperature of the barrel in a stream-lined fashion thus permitting conventional microprocessors to process the information in sufficient time to actually control the barrel temperature in a predictive manner.

It is a basic object of the invention to provide a barrel temperature control for an injection molding machine which accurately predicts the future temperature of the barrel to provide a more responsive control of the barrel temperature than heretofore possible.

It is a still further object of the invention to provide an injection machine barrel temperature controller which accounts for barrel heat attributed to disturbances such as shear heat from the plastic melt to better control the temperature of the barrel.

It is a more specific object of the invention to provide a barrel temperature control for an injection molding machine which is capable of controlling the barrel temperature without receiving any signal indicative of the current barrel temperature.

It is yet another general object of the invention to provide an improved barrel temperature controller which is based on feed forward control principles as contrasted to conventional feedback control concepts which characterize conventional controls.

Yet another object of the invention is to provide a barrel temperature control for an injection molding machine which provides a more responsive and accurate control of the barrel temperature using sophisticated controls based on modeling techniques at less cost than existing temperature controllers.

Yet another object of the system is to provide one control system which can be universally applied to injection molding machines of different sizes having different barrel geometries.

Still another object of the invention is to provide a temperature controller for a barrel or similar shaped tubular member used in extrusion machines or die casting machines forcing or injecting a melt, plastic or metal, through the end of the barrel into a die in which the temperature of the barrel is more closely controlled than here-to-for possible.

These and other objects of the invention will become apparent to those skilled in the art upon reading and understanding the Detailed Description of the Invention set forth below.

BRIEF DESCRIPTION OF THE DRAWINGS

The invention may take form in certain parts and arrangements of parts, a preferred embodiment of which will be described in detail in this specification and illustrated in the accompanying drawings which form a part hereof and wherein.

DETAILED DESCRIPTION OF THE INVENTION

Figure 1:
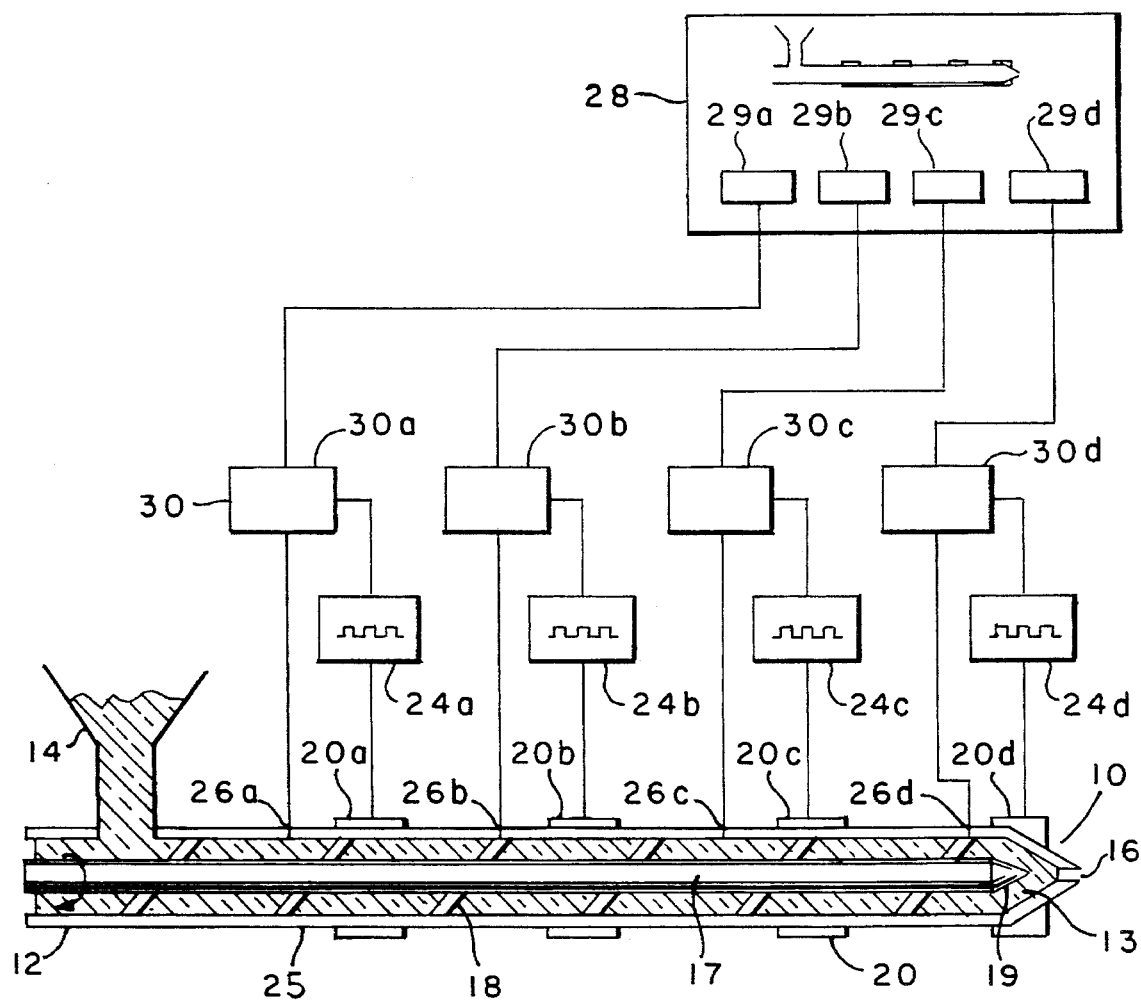
FIG. 1 is a schematic representation of a prior art barrel control system using P.I.D loops.

Referring now to the drawings wherein the showings are for the purpose of illustrating a preferred embodiment of the invention only and not for the purpose of limiting the same there is shown in FIG. 1 a prior art control system regulating the barrel temperature of an injection molding machine 10. Injection molding machine 10 is entirely conventional and will not be described in any detail herein. For purposes of the invention injection molding machine 10 includes a cylindrical barrel 12 through which plastic melt designated by reference numeral 13 flows. In fluid communication with cylindrical barrel 12 is a feed hopper 14. Plastic material is heated in feed hopper 14 and fed as plastic melt 13 into cylindrical barrel 12. Plastic melt 13 exits cylindrical barrel 12 through a nozzle opening 16 formed at one end of cylindrical barrel 12 and adapted to be in fluid communication with a mold (not shown). Within cylindrical barrel 12 is a ram screw 17 having screw flights 18. As well known to those skilled in the art, plastic melt 13 is fed through screw flights 18 upon rotation of ram screw 17 and deposited within cylindrical barrel 12 between forward end 19 of ram screw 17 and nozzle opening 16 thus pushing or retracting ram screw 17 axially backwards within cylindrical barrel 12. When a sufficient quantity of plastic melt 13 has been collected in front of ram screw 17, ram screw 17 is pushed forward, usually very rapidly, and the plastic melt is injected into the mold through nozzle opening 16. Speed of rotation of ram screw 17 generates heat, shear heat, of the plastic melt and is one of the primary factors controlled by injection molding machine 10. The speed of screw travel during injection may also affect the heat of the plastic melt although this is not considered significant. Also, heat externally applied to cylindrical barrel 12 is another factor which affects the temperature of plastic melt 13. In addition, the molder usually applies or controls the transfer of heat to or from the mold by means of any number of heat transfer techniques specific to the mold design employed which form no part of the present invention.

Apart from shear heat and heat by conduction from plastic melt 13 occurring at the inside of cylindrical barrel 12, external heat is typically applied by heater bands 20 surrounding cylindrical barrel 12 and extending longitudinally some distance along cylindrical barrel 12 between feed hopper 14 and nozzle opening 16. Typically, there are four heater bands designated by reference numerals 20a, 20b, 20c and 20d in FIG. 1 and indicating, respectively, the rear, center, front and nozzle heating bands spaced between feed hopper 14 and nozzle opening 16. It is to be appreciated that the description of the invention will discuss heater bands and zones somewhat interchangeably when, in fact, there may be more than one physical heating band in a zone. Thus, reference to rear heating band 20(a) may include several physical bands, all of which, however, are identically controlled. Many machines use only three bands and some small machines have two. Each heater band 20 generally comprises resistance heater elements 22 which generate heat when an electric current flows through the elements. Typically, the flow of current is controlled by means of an adjustable circuit typically termed a duty cycle, which applies current at adjustable on-off periodic cycles to heater elements and is shown schematically as a duty cycle controller designated by reference numeral 24. Each band has its own duty cycle, there being four such duty cycle controller designated by reference numerals 24a, 24b, 24c and 24d in the drawings. The duty cycle controller typically applies full current in a periodic on-off manner. Conceptually, any variable current control device can be used. Of course, the invention can be applied to any type of variably set controller for heater bands 20.

Cylindrical barrel 12 is defined by a barrel wall 25 and situated within and at about the middle of barrel wall 25 is a thermocouple 26 for each heater band 20 usually positioned at about the longitudinal mid-point of heater band 20. There are thus four thermocouples designated by reference numerals 26a, 26b, 26c and 26d indicating, respectively, the rear, center, front and nozzle thermocouples. Injection molding machines 10 typically are equipped with programmable controllers which generally have an operator console screen 28 capable of displaying a variety of machine operated pictures or views, one of which, generally illustrated in FIGS. 1 and 2, controls heater bands 20a–d and visually shows the present temperature sensed by thermocouples 26a–d. The operator thus dials in a desired temperature, a set point signal temperature for each heat band 20a–d and this is shown schematically in the drawings by reference numerals 29a, 29b, 29c and 29d for the set point temperatures, respectively, of the rear, center, front and nozzle portions of barrel wall 25. Because operator screen typically shows the present temperature of thermocouples 26a–d, the operator has a visual check of the barrel temperature where he can see a thermal run away, breakdown, etc.

In the prior art system shown in FIG. 1, a P.I.D. (proportional, integral, derivative or differential) controller 30 is utilized, there being four such controllers designated 30a, 30b, 30c and 30d respectively for the rear, center, front and nozzle portions of cylindrical barrel 12. Each P.I.D. controller 30 receives a thermocouple signal 26 and a set point signal 29 and develops an electrical signal to control duty cycle controller 24. In its most fundamental form the prior art system is a classical, closed-loop feedback control system in that set point signal 29 is compared to thermocouple signal 26 and the difference zeroed or nulled out by means of a control signal applied to duty cycle controller 24. However, today's P.I.D. controllers 30 are more advanced. They are capable of differentiating and integrating rate of change and projecting future temperature signals to make more accurate and responsive gain control signals. It is also to be appreciated that all P.I.D. controllers 30a–d are mounted or wired into a common circuit board and employ algorithms for the gain terms which are sophisticated and unique to each control manufacturer. Further, in the newly developing area of adaptive tuning of P.I.D. controllers 30, memory capacity is added to the controller and past events are stored and utilized to continue to adjust the gain over time. All of these controls must wait for the heat from adjacent zones or layers to travel to the mid-point layer before they react. Their approach has been to try to recognize quicker some small change and use that change to predict some momentous change. The prediction may work fine in one case, but be totally unacceptable in another case.

Insofar as general temperature control systems are concerned general, prior art references disclose sampling temperatures upstream and downstream of the site where a temperature is recorded and chaining the sample together. While it is not known whether such techniques have been used as a control for the barrel of an injection molding machine, should such approach be tried, an improved controller could conceptually result, provided the chaining could be accurately factored to the zone under observation.

However, whatever factoring is applied to heater band 20 signals based on other thermocouple readings, the results may be good, bad, or indifferent, since the temperatures that the other thermocouples have sensed may not necessarily be predictive of what their temperatures will be after some time lag during which heat is transmitted by conduction through the barrel wall from one zone to the other. Further the factoring may be predictive of one type of disturbance but completely unacceptable for another. Finally, there is a time limit controlling the sophistication of the algorithms used in the controller since calculations must be made before the heat conduction resulting from the calculations substantively occurs.

The present invention overcomes the problems discussed above and is diagrammatically illustrated in FIG. 2 to have functional hardware which is not entirely dissimilar to the prior art system shown in FIG. 1. Accordingly, reference numerals used in describing the prior art components will likewise apply to system components of the present invention where applicable. Thus, the present invention employs four heater bands 20a–d, four duty cycle controllers 24a–d, four thermocouples 26a–d situated at the midpoint of barrel wall 25 of cylindrical barrel 12 and an operator console screen 28 for setting four set point signal temperature 29a–d at, respectively, the rear, center, front and nozzle zones of cylindrical barrel 12. Any similarity with prior art barrel temperature control systems now ends.

MATHEMATICAL DISCUSSION

The underpinning of the present invention is to model the control system to duplicate mathematically the heat transfer occurring within barrel 12. Considering the problem as a mathematical formulation it is known that within a solid object, heat will flow from the warmer to the cooler section of the object at a rate proportional to the difference in temperatures between the sections. Inserting the proportionality constant which is given by the thermal conductivity of the material "k" and the cross sectional area "A" normal to the temperature gradient, this relationship for the heat flow "q" is expressed by the Equation No. 1 identified below which is known as Fourier's Law of Heat Conduction. From Equation No. 1 the general heat conduction equation for constant thermal conductivity and heat production can be derived and is expressed as Equation No. 2 below.

$$q = -ka \frac{\partial T}{\partial x} \tag{1}$$

$$\frac{\partial^2 T}{\partial x^2} + \frac{\partial^2 T}{\partial y^2} + \frac{\partial^2 T}{\partial z^2} + \frac{q}{h} = \frac{1}{a}\frac{\partial T}{\partial t} \tag{2}$$

In Equation No. 2 "T" is the temperature, "q" is the heat II ! 1 II II generated within the solid, and alpha is known as the thermal diffusivity of the material and is given by the thermal conductivity "k" of the material divided by the product of its specific heat and density. This partial differential equation, a form of the diffusion equation, specifies a relationship between the rate of change of temperature with respect to time and the current spatial temperature distribution.

From this relationship describing the instantaneous temperature change and given an initial temperature distribution and function specifying heat generation, an equation may be sought which specifies the temperature at all points of the solid as a function of time. Descriptions of the analytical solution of the diffusion equation in general (Equation No. 1) and the heat conduction equation (Equation No. 2) for different boundary conditions and shapes may be found in text books on partial differential equations and frequently involves the method of separation of variables. This method results in a solution which is usually an infinite series of exponential terms where the coefficients and powers are chosen to satisfy initial conditions.

Representing the solution of the differential (Equation No. 2) as T(x,y,z,t), the goal of the control system may be expressed mathematically as a boundary value problem with initial conditions (as set forth in Equation No. 3 below), desired temperature reading at thermocouple coordinates $(x_n, y_n, z_n)$ of $T_n$ (as shown in Equation No. 4 below), steady state conditions (as shown in Equation No. 5 below), with heater band energy in zone n of $b_n(t)$ (as shown in Equation No. 6 below), thermal load disturbance (as shown in Equation No. 7 below), and convective heat loss to the environment which may be represented by Newton's Law of Cooling (as expressed in Equation No. 8 below) where "h" represents the atmospheric heat loss coefficient and "$T_{oo}$", the ambient temperature. The problem is then to find a series of duty cycles {u} which will generate a $b_n(t)$ such that all the conditions are met.

$$T(x,y,z,0) = T_o(x,y,z) \tag{3}$$

$$T(x_n,y_n,z_n,t) = T_n \quad \text{where } n = 1.4 \tag{4}$$

$$T'(x_n,y_n,z_n,t) = 0 \tag{5}$$

$$q(x,y,z,t) = b_n(t); b_n(t) > 0 \tag{6}$$
for x,y,z in contact with heater band $n$ $$q(x,y,z,t) = f(x,y,z,t) \tag{7}$$
for x,y,z in contact with melt $$q(x,y,z,t) = h \cdot (T(x,y,z) - T^{\infty}) \tag{8}$$
for x,y,z at surface of barrel A solution, a series of duty cycles, u, to these equations might not exist due to the limitation of only limited positive control force (Equation No. 6) and the uncontrolled load disturbances (Equation No. 7). Further, many of the variables are simply not available for use by the control system. Finally, should certain techniques (numerical techniques for boundary value problems such as "shooting methods") be attempted, the real time it takes to perform the calculation renders the approach unfeasible.

Because a numerical solution to the equations listed above is not feasible, a simplified model which, while not exact, nevertheless represents important features of the energy storage mechanism within the barrel and the geometrical arrangement of the barrel temperature zones is used in the control system of the present invention. Through experimentation and actual test verifications, it was determined to base the control system of the present invention on a 16 state lumped heat capacity analysis. What is basically done is to divide cylindrical barrel 12 into its four zones, designated as a, b, c, d for the rear, center, front and nozzle, respectively, and then divide each zone into four radially extending layers (alternately referred to as "nodes"), designated as reference numeral 1 for the heater band layer, reference numeral 2 for the outer layer of cylindrical barrel 12, reference numeral 3 for the middle layer of cylindrical barrel 12 where thermocouple 26 is positioned and reference numeral 4 for the inner layer of cylindrical barrel 12 which is in contact with plastic melt 13. Outer layer 2 and inner layer 4 is contiguous with middle layer 3. The four zone cylindrical barrel 12 thus produces a total of 16 layers, each of which is subjected to a lumped heat capacity analysis to permit the simplest of finite difference methods to be used for accuracy and stability.

Figure 3:
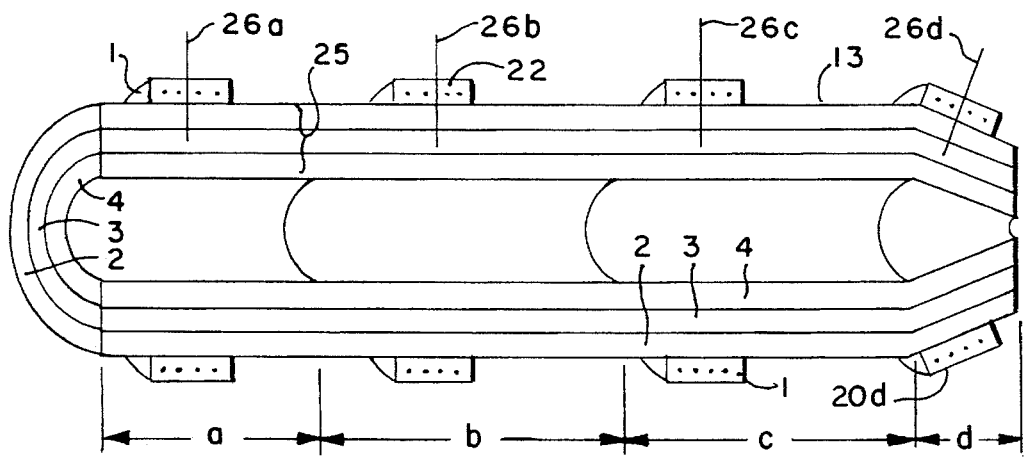
FIG. 3 is a perspective sectioned view of the barrel of an injection molding machine showing the zones and layers of the barrel which are modeled by the present invention.

This is done for the four zone barrel by means of a variation of a 16th order state controller. In a state controller, the values of pertinent quantities are used directly in a system of simultaneous differential equations to determine the control force required in order to bring the deviation of the current temperature from the desired temperature to zero. The state variables used in the present invention are the temperatures at each of the layers which total sixteen layers. (For a three zone barrel a 12th order state controller would be used and, should a five zone barrel be employed, a 20th order state controller would be employed). This is schematically shown in FIG. 3.

THE CONTROL LAW OF THE PRESENT INVENTION

Through a formulation based on a lumped heat capacity analysis the rate of change of the temperature of any single layer may be estimated by repeatedly applying Fourier's Law of Heat Conduction (Equation No. 1) for each surrounding layer and Newton's Law of Cooling (Equation No. 8) for each surface layer taking into account the surface area separating layers and the distance between layers as well as the thermal conductivity, specific heat, and mass of the barrel together with the atmospheric loss coefficient. Equation No. 9 listed below, for example, may be written for the rate of change of temperature in the outer layer of rear zone, a-2, where $X_n$ is the average temperature in layer n, $r_s$ the surface radius, $r_3$ the radius to the start of the surface layer, $r_{ts}$ the distance from the center of the surface layer to the middle layer, $r_{1-2}$ the distance from the center of the heater band to the center of the surface layer, $x_3$ the position of the center zone thermocouple, $x_2$ the position of the front zone thermocouple, $x_1$ the position of the center of the heater band, 1 the length of the zone, and $V_2$ the volume of the rear zone.

$$X_2' = \left[ -2\pi h r_s l X_2 + \frac{2k\pi r_3 l}{r_{ts}} (X_3 - X_2) + \frac{2k\pi(r_s^2 - r_3^2)}{x_3 - x_2} (X_6 - X_2) + \frac{2k\pi r_s l}{r_{1-2}} (X_1 - X_2) \right] / (\rho c V_2) \tag{9}$$

Equations similar to Equation No. 9 may be written for each layer node. These simultaneous equations may be written in matrix notation (for example, as shown and discussed hereafter with respect to FIGS. 6 and 6a) as shown below in Equation No. 10:

Equation 10:

$$X'(t) = A \cdot X(t) + B \cdot U(t) + F(t) \tag{10}$$

Where:

X'(t)=rate of change

A·X(t)=contribution to the rate of change due to the present temperature in A

B·U(t)=contribution to the rate of change due to the command signal controlling the heater band wattage F(t)=is the load disturbance which includes everything in the system that affects heat which is not modeled into the system or equation terms such as the shear heat from the screw, the temperature disturbances caused by atmospheric loss attributed to wind blowing about the barrel, etc.

More specifically, the terms of matrix Equation No. 10 are:

(t) means at any given time

X means temperature at all nodes

X' means rate of change of temperature

A is a matrix of values based on heat exchange laws

B is a driving force matrix based on the wattage of the heater bands

U is the command signal

F is the load disturbance

Thus, it is possible by Equation No. 10, given the current state of all the layers, the control force or energy inputted by the heater bands and the load or heat disturbances to predict the temperature changes at a future time to apply or input the required amount of heat to obtain a desired peak temperature at the exact desired set point temperature in each zone.

More particularly, the invention controls the barrel temperature by setting the barrel temperature based on two separate predictions of barrel temperature or two control loops or "two degrees of freedom". Generally, the control is expressed by Equation No. 11 below:

$$U(t)=G_1 \cdot [R-("a")]+G_2[R-("b")] \quad (11)$$

Where:

U(t)=control signal for the heater bands at any given time $G_1$=calculated gain term $G_2$=calculated gain term R=set point temperature, i.e., the temperature dialed in for the control R−("b")=the amount of heat needed to reach the peak for R temperature R−("a") the amount of heat needed (expected temperature loss) to maintain the temperature of the barrel at the peak temperature R.

Figure 9:
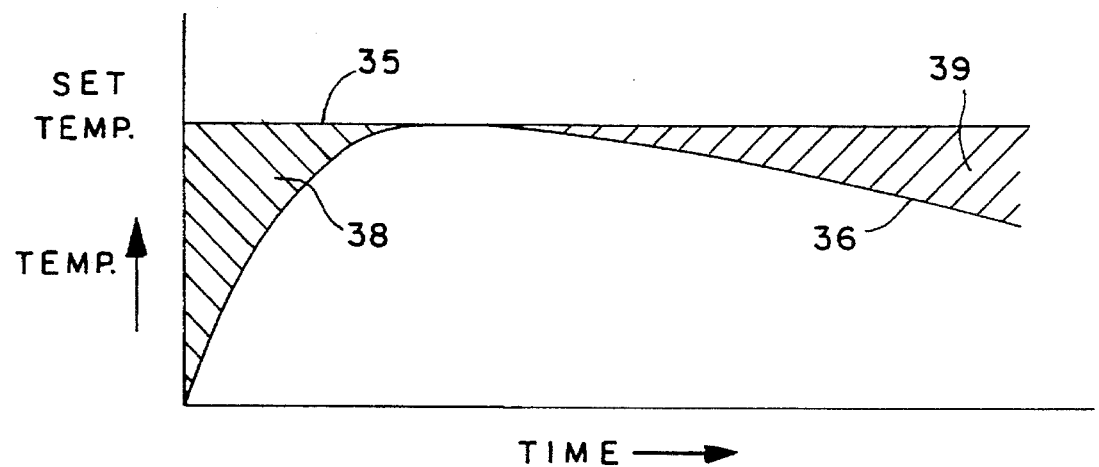
FIG. 9 is a graph showing the initial ramp heating time of the control of the present invention to illustrate the application of the control law used in the present invention.

Equation 11 may be graphically illustrated by FIG. 9 which shows the set point temperature line 35 and the heat up curve 36 for middle layer 3. That portion of heat up curve 36 needed to reach the peak temperature is proportional to the $G_2$ term and is indicated graphically by the cross-hatched area shown as reference numeral 38. The $G_1$ term may also be viewed as proportional to that portion of heat up curve 36 needed to maintain the temperature at the peak temperature and is indicated graphically in FIG. 9 by the cross-hatched area shown as reference numeral 39. The G1 term may be viewed as proportional to that portion of the heat needed to maintain the barrel at peak equilibrium or steady state peak temperature. In contrast to the present invention, it should be noted that traditional servo PID controls use only one loop and thus inherently are unable to achieve the controllability achieved by the present invention.

Equation 11 can be written into its expanded matrix form in Equation No. 12 listed below as follows:

$$U(t) = G_1 \cdot (R - (A^{10} \cdot R + \sum_{i=1}^{10} A^{10-i} \cdot (F(t) + i \cdot F'(t)) + \quad (12)$$

$$G_2 \cdot (R - A^s \cdot (X(t) + \sum_{i=1}^{s} A^{s-i} \cdot (F(t) + i \cdot F'(t)))$$

Where:

i=time increments (seconds)

10=10 seconds

F'(t)=rate of change of F at time t

F(t)=load disturbance at time t

F(t)+i·F'(t)=predicted bias at any time $A^{10-i}$=homogeneous temperature response for 10−i seconds into the future $A^{10}$·R=predicted temperature distribution for 10 seconds into the future s=the time (or run) into the future (horizon) until the temperature drops thus establishing the peak temperature. This has been determined through trial and error or observation to extend for a time period as long as 180 seconds (3 minutes). Thus S is set by computer to calculate a time period as long as 3 minutes.

$A^s$·X(t)=predicted temperature at time s.

Generally the control law (Equation No. 12) programmed into the control of the present invention first loads the target or the desired set temperature into the control and calculates what the temperature is after ten seconds (by 10 one second optimized extended precision integer matrix multiplications) with load disturbances added. The new temperatures (16 temperatures) at the end of the ten second time period are used to compute the expected steady state heat loss. This amount of heat (the expected steady state heat loss) factored by the amount of heat delivered by the heat loads is sometimes referred to as the "feed forward" term and is the first term in Equation 3 starting with $G_1$ . . . (G) used in the load duty cycle. Now added to the steady state heat loss, is an additional heat value proportional to the current energy error which is the second term in Equation No. 12 starting with $G_2$. This energy error term is calculated by advancing the current temperature state 180 seconds into the future and recording the peak values of the temperature with load disturbances added but without any application of a control force (i.e., Equation No. 10 but without the term B·U(t)). This value is then factored by the heater load energy and multiplied by a gain term $G_2$ so as not to induce oscillations and forms the second term of the control law. The two terms starting with $G_1$ and $G_2$ thus form the duty cycle U(t).

At least two functions are accomplished in the control system of the present invention which involve Matrix A and which lead to improved performance of the system. As noted at the outset, Matrix A, in theory, involves determining the temperature for each layer by considering the heat transfer to or from any given layer by all the remaining layers in barrel 12. This involves a simultaneous calculation of 16×16 equations or 256 calculations. The microprocessor time to perform such calculations for 10 one second integrations into the future would exceed 10 seconds. The control would be unresponsive and potentially unstable. Stability is important in the control since if the system does not frequently monitor and adjust, the system will run out of control. To shorten the processing time without adversely affecting the accuracy of the predicted system, the invention calculates the temperature of any given layer by considering the heat transfer from or to (i.e., with respect to) any given layer by only adjacent layers in contact with the given layer. When applied in the control law, there are repeated iterations so that the heat transferred by all layers on any given layer or node is considered. However, heat transfer with respect to any further removed layers is simply assigned a zero value.

Figure 6:
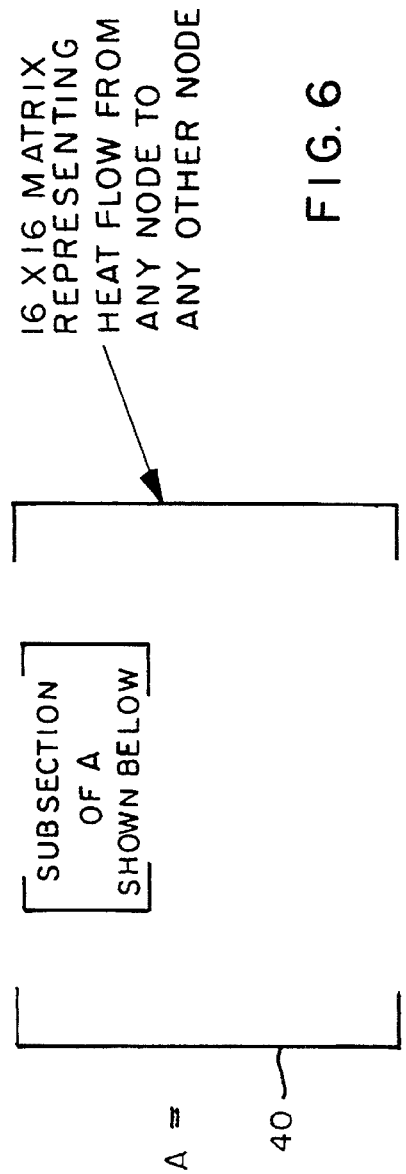
FIG. 6 is a general schematic representation of how matrix A of the invention is formulated.
Figure 6A:
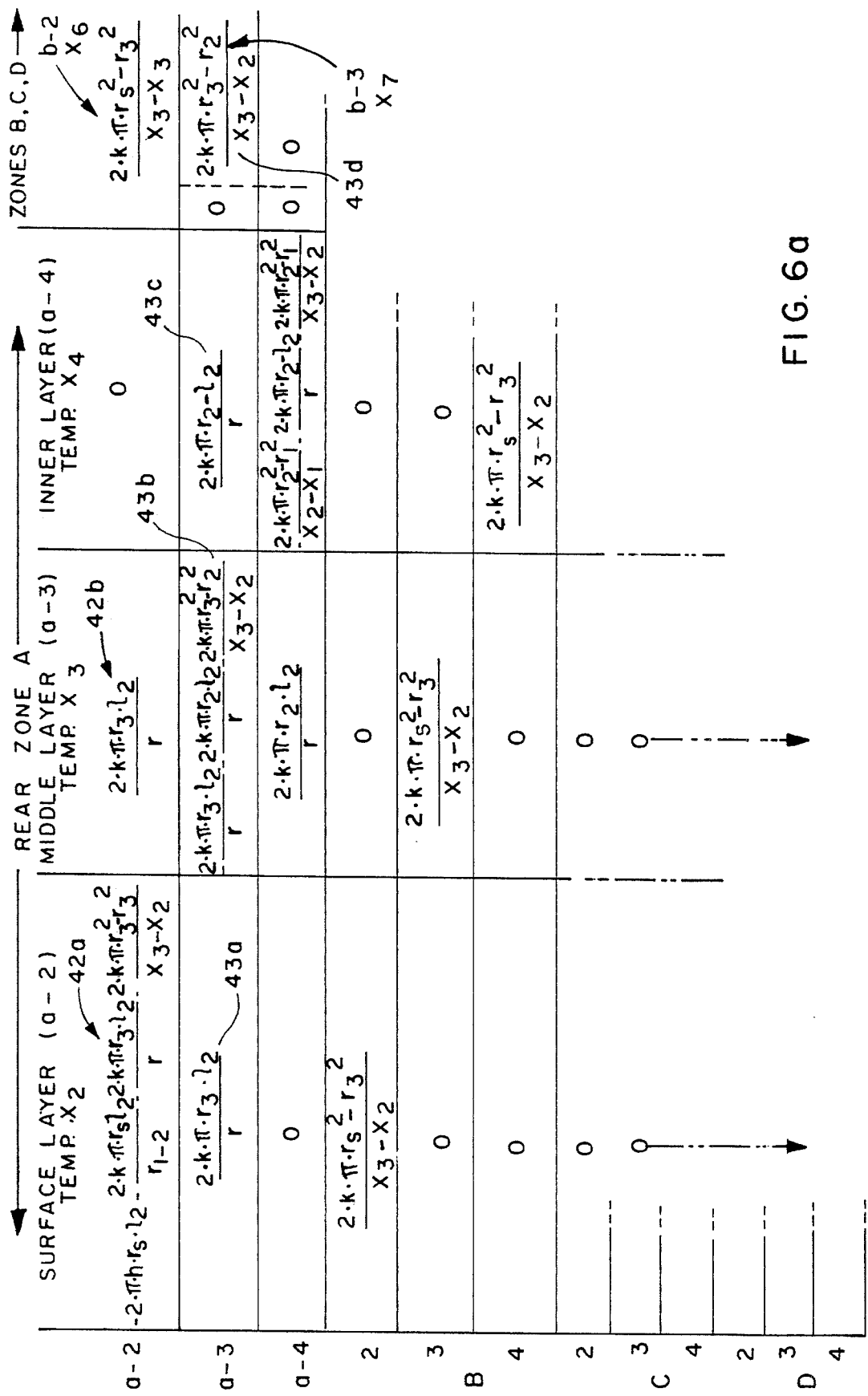
FIG. 6a is a portion of matrix A illustrating the heat transfer calculations performed on a portion of the barrel in accordance with the invention.
Figure 7C:
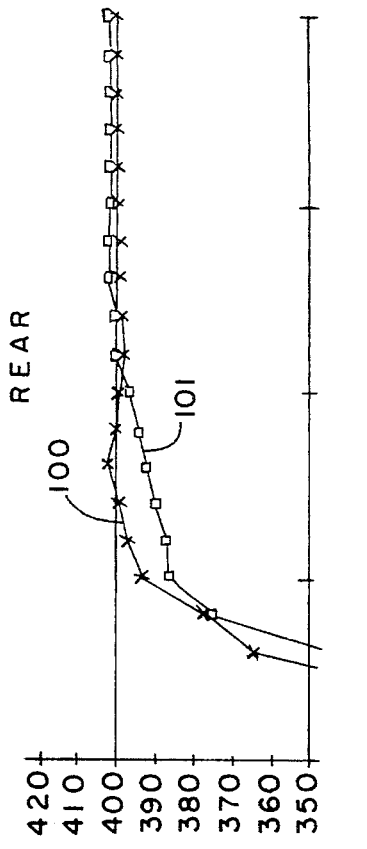
FIGS. 7a, 7b, 7c, and 7d are graphs showing barrel heat-up temperature rates for the rear, center, front and nozzle barrel zones respectively of the temperature controller of the present invention compared to that obtained by a state-of-the-art control.
Figure 7D:
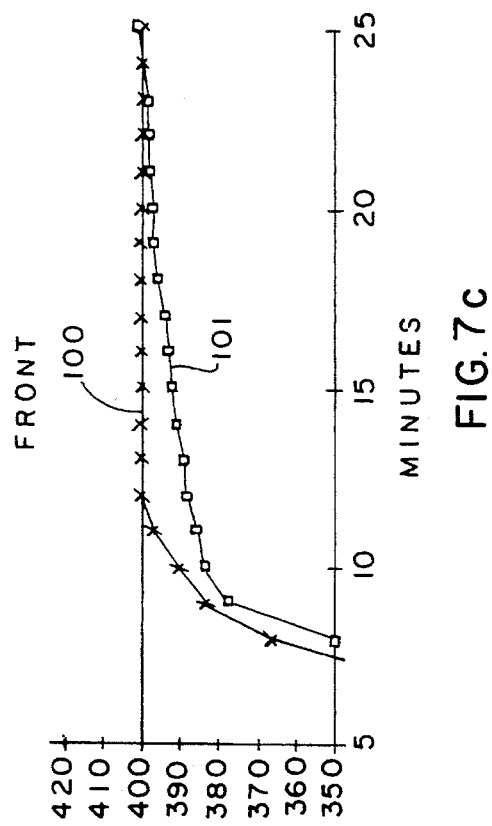
Figure 7A:
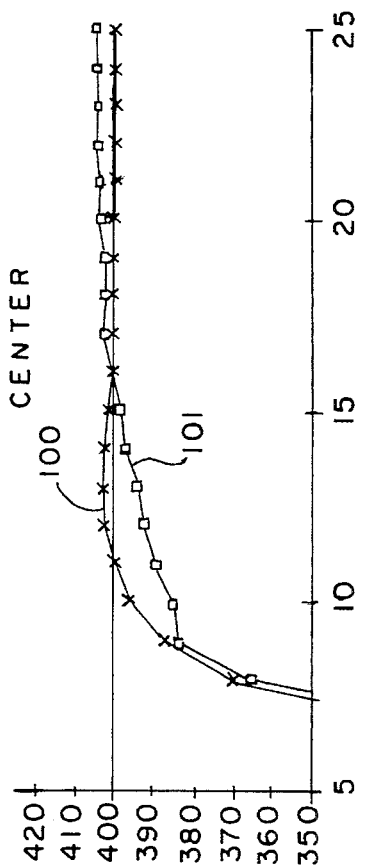
Figure 7B:
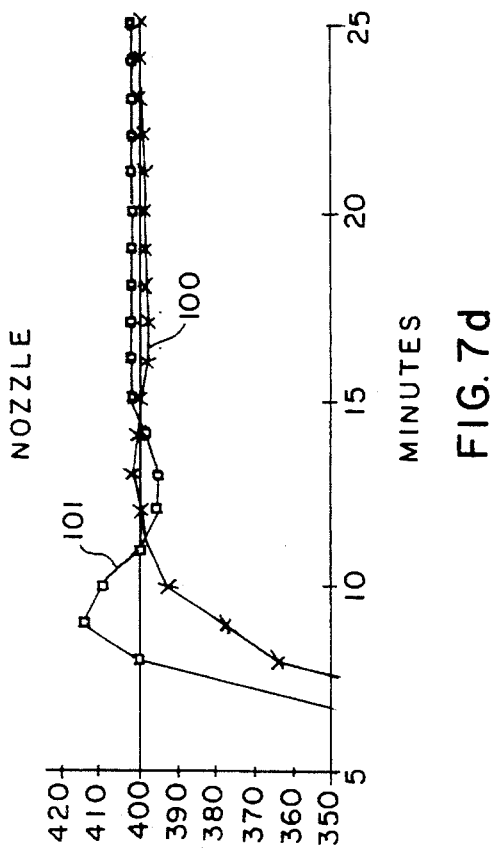

This is graphically illustrated in FIGS. 6 and 6a. Reprinted in FIG. 6 is equation 9 showing the rate of temperature change for the surface layer or node of the rear zone, a-2 in accordance with the invention. In theory, temperature change of each layer is determined by the heat transferred to or from the layer by all the other layers. Considering the heat transferred by each heater band 20 as a layer results then, for a four zone barrel, in the simultaneous determination of 16 temperature changes (four layers per zone times four zones) with each layer's temperature change determined from the heat transferred from all of the other layers resulting in 256 calculations (16×16). The calculations are schematically shown in a matrix array or in matrix rotation designated A and shown as reference numeral 40 in FIG. 6. Again, in theory because each temperature change of a layer would consider the heat transfer from all other layers, equation 9 would contain 16 terms. The time to calculate 16 equations containing 16 terms for a ten second iteration would be excessive.

Accordingly, the system of the invention considers heat transferred only from and to adjacent or contacting layers. Heat transferred from and to removed layers is ignored in any given set of calculations. However, since the calculations are carried out for ten increments on a second-by-second iteration, the effect of all layers on any given layer is in fact, considered (since the heat propagates from further zones to adjacent zones during this iteration time period and are thus accounted for).

This is schematically illustrated in FIG. 6. To determine the rate of change of temperature $X'_2$ of the surface layer of rear zone a-2, equation 9 considers the heat transferred between surface layer rear zone a-2 and adjacent heater band rear zone a-1 which is shown by the expression designated 41a in equation 9. Also considered is the heat transferred between rear zone surface layer a-2 and adjacent rear zone middle layer a-3 which is shown by the expression designated 41b in equation 9. Also considered is the heat transferred between rear zone surface layer a-2 and adjacent center zone surface layer a-3 which is shown by the expression designated 41c in equation 9. Finally because surface layer 2 is exposed to atmosphere, the heat transfer effects with the surrounding atmosphere on rear zone surface layer a-2 is shown by the expression designated 41d in equation 9. (The convective heat transfer co-efficient h can be factored by the ambient temperature sensed by a thermometer, not shown.) Heat transfer for all other layers with respect to rear zone surface layer a-2 is ignored. For nomenclature purposes, temperature of each layer is shown to numerically progress from the rear zone to the nozzle zone, and is identified for rear zone heater band layer a-1 as X, rear zone surface layer a-2 as $X_2$, until reaching inner nozzle layer d-4 designated as $X_{16}$. In accordance with the invention, 16 equations are constructed (one for each layer) and solved simultaneously. When the machine is operating, temperatures $X_3$, $X_7$, $X_{11}$, $X_{15}$, of center layers 3 are periodically inputted from thermocouples 26a–d resulting in the calculation of the temperatures X at that instance for all the other layers which then generate future temperatures of all layers through application of the control law.

A portion of the matrix by which the simultaneous calculations are performed is shown in FIG. 6a. The array in FIG. 6a does not show heater band layers a-1, b-1, c-1, d-1 although heat from heater bands 20 is considered. (Heat generated from heater bands 20 is determined by a 16×1 matrix B with all but four elements assigned a zero value in the matrix and which considers heat transfer with respect to the atmosphere as well as heat originating from within the bands as a result of the duty cycle.) Thus, the array in FIG. 6c is a 12×12 array (three barrel layers for four temperature zones) and only a portion of the array is shown, principally for rear zone a.

In the FIG. 6a array, the zones progressively extend from a through d and extend from left to right in rows (on the horizontal axis) when viewing FIG. 6a. Similarly, the zones progress from a through d and extend from top to bottom in columns (on the vertical axis) when viewed in FIG. 6a. The expressions shown in each column are multiplied by the temperature for that layer under which the expression falls. Thus the expression designated 42a in FIG. 6a would be multiplied by the temperature $X_2$ for rear zone surface layer a-2. The expression designated 42b would be multiplied by the temperature $X_3$ for center zone surface layer a-3. Equation 9 would then be solved by adding all the expressions in the row designated a-2 in FIG. 6a. It is to be understood that the expression for heater band 20a (i.e., that portion of expression 41a reflected by temperature $X_1$) is not shown as is the constant denominator for equation 9. All the other values in row a-2 would be set at zero. Similarly to determine the rate of temperature change $X_3'$ for rear zone middle layer a-3, the expressions in row a-3 designated 43a, 43b, 43c and 43d would be multiplied by the temperature for their respective columns to result in the equation 9a for layer a-3 as follows:

$$X_3' = \left[ \frac{2k\pi(r_3 l_2)}{r_{ts}} (X_2 - X_3) + \frac{2k\pi r_2 l_2}{r_{4-3}} (X_4 - X_3) + \frac{2k\pi(r_3^2 - r_2^2)}{x_3 - x_2} (X_7 - X_3) \right] / (pcV_2) \qquad (9a)$$

All the other values in row a-3 would be set to zero.

As noted above, when the calculations are repeatedly performed in accordance with the control law of equation No. 12 the heat transfer effects of all zones on any one given zone are considered. Thus, the time for making the calculations is significantly reduced but the accuracy of the control is maintained. This allows frequent observations of the temperature and corrections during a plastic run thus making a stable control. By way of example, it may take the processor slightly over a second to calculate equation 12 using Matrix A as described above whereas it could easily take the processor ten seconds or so to otherwise calculate the heat transfer throughout the entire array. Obviously, the control would not be responsive.

A similar calculation is applied for heater band layers a-1, b-1, c-1 and d-1. In fact, a single value, i.e., $b_1$, $b_2$, $b_3$, $b_4$ for each heater band is simply calculated using the power available to the heater band from the power supply. The heat transfer value for heater bands 20 are then positioned into the heat transfer inputted to surface layers a-2, b-2, c-2, and d-2 as explained above for layer a-2.

Figure 10:
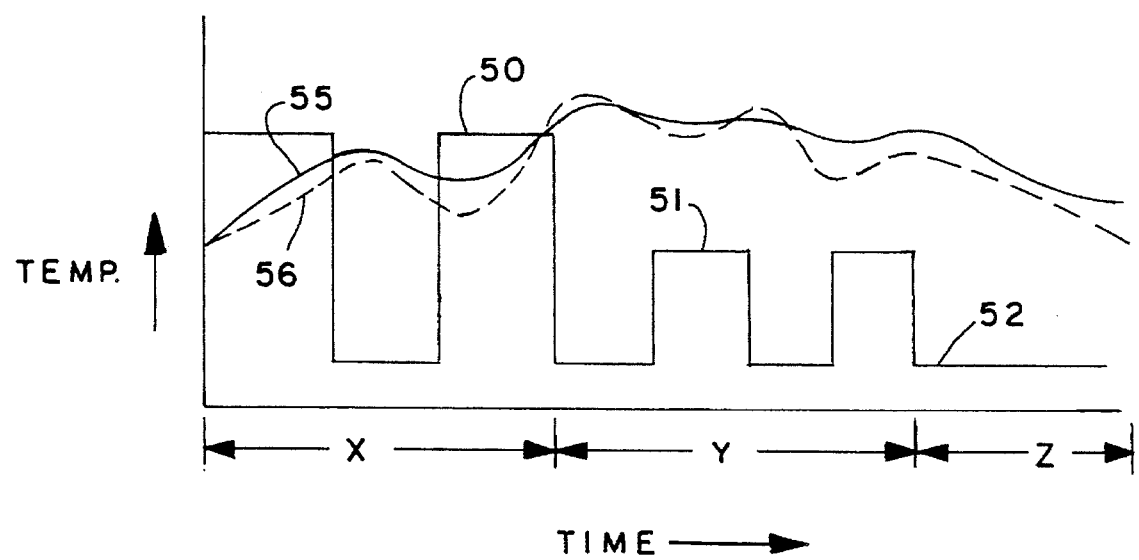
FIG. 10 is a graph depicting schematically how a multi-dimensional curve is fitted for the control during calibration of the system.

Furthermore, Matrix A is based on barrel geometry and contains known values. It is therefore definable as opposed to some other control scheme which attempts to simply assign some proportional value to the layers based on some estimation technique. What is not known and what will vary from one cylindrical barrel 12 to the next cylindrical barrel 12 of an injection molding machine because of manufacturing variations within each barrel is the heat transfer co-efficient "k" for thermal conductivity within barrel wall 25 and the heat transfer co-efficient "h" reflecting atmospheric heat loss. While hypothetical heat transfer co-efficients are initially used, the process of the invention uses a calibration technique in which machine specific heat transfer co-efficients are generated. This is graphically illustrated in FIG. 10.

During machine calibration, heater band duty cycle controller 24 is regulated in a known time-power manner so that a duty cycle at full power shown as 50, for a discrete time period x is applied, followed by a duty cycle at half power shown as 51 for a discrete time period y followed by no power 52 for a discrete time period z, etc. This sequence will produce for each thermocouple 26 an actual curve designated by solid line 55 in the drawings. The actual curve 55 is obtained from the direct readings of thermocouples 26 a–d. The hypothetical temperature predicted by the controller of the invention using hypothetical heat transfer co-efficients values is shown by broken line 56 which is the hypothetical temperature curve. In accordance with the broad concept of the invention, any mathematical technique, such as least squares, can be employed to generate values for the heat transfer co-efficients h and k which will result in hypothetical curve 56 simulating actual curve 55. In accordance with the invention the parametric estimation of the heat transfer co-efficients is obtained by a multidimensional curve fitting algorithm which reduces to a minimum the squared error of hypothetical curve 56 from actual curve 55. The algorithms used do not, per se, form part of the present invention. Other mathematical techniques known to those skilled in the art can be used. The inventive concept utilized is to calculate the temperature resulting from the heat transfer between the layers by using known values in which unknown variables are reduced to a minimum so that the unknown variable can be estimated vis-a-vis the calibration procedure. There is then a sound, accurate basis for predicting the future temperature which cannot be duplicated by other control techniques. This forms one of the underpinnings of the invention which becomes physically possible to perform in a real time control environment by the simplification or streamlining of Matrix A to reduce the number of instantaneous calculations performed at discrete time intervals to a manageable number permitting utilization of conventional microprocessors. It should also be noted that in addition to establishing the actual heat transfer co-efficients "k" for cylindrical barrel 12 and "h" for heater bands 20, a scaling co-efficient is likewise estimated and applied because of dimensional manufacturing tolerances experienced from one barrel to the next barrel. It should also be appreciated that the heat transfer calculations as set forth in FIG. 6 are calculated by computer during the calibration period and the actual calculated results of Matrix A and Matrix B are stored or written to battery protected data. The resultant numbers are then used in the control law of Equation No. 12 when the system is used. The actual calculations using all the fixed numbers in the heat transfer equations are used.

As thus far described, the system will work satisfactorily and in a manner superior to P.I.D. controllers. However, the system is subject to load disturbances. Load disturbances occur, for example, when shear heat is generated by screw rotation or during cyclic injection of plastic melt 13, or in any other number of ways. The system of the present invention accounts for the load disturbance during operation after Matrix A co-efficients have been established (which are determined without plastic melt present). With injection molding machine 10 operating and processing plastic melt 13 the current estimate of the temperature calculated for middle layers 3 is advanced for a ten second period and the calculated temperature is compared to the actual temperature recorded by thermocouples 26 at the end of the ten second period. The difference between the estimated temperature and the actual temperature is attributed to the plastic melt and the heat transfer calculation for inner layers 4 of each zone a, b, c, and d are factored to arrive at a value producing an estimated temperature at middle layers 3 which corresponds to the actual temperature. This disturbance value or factor is recorded and stored in a buffer. Thus, the disturbance is not directly accounted for by directly factoring the temperature of middle layer 3. Instead, the disturbance is attributed to the temperature of inner layer 4 which is what happens in real life and layer 4 being in contact with layer 3 thus affects the heat exchange with and accordingly the temperature of layer 3. The procedure is repeatedly continued during the plastic run until an accurate value for the disturbance has been obtained and to which a time gradient is applied. Similarly, when the system runs open loop without reliance on signals from thermocouples 26, the heat transferred from heater band layers 1 is known from the duty cycle and from this the temperature of middle layer 3 can be calculated vis-a-vis matrix A.

Figure 4:
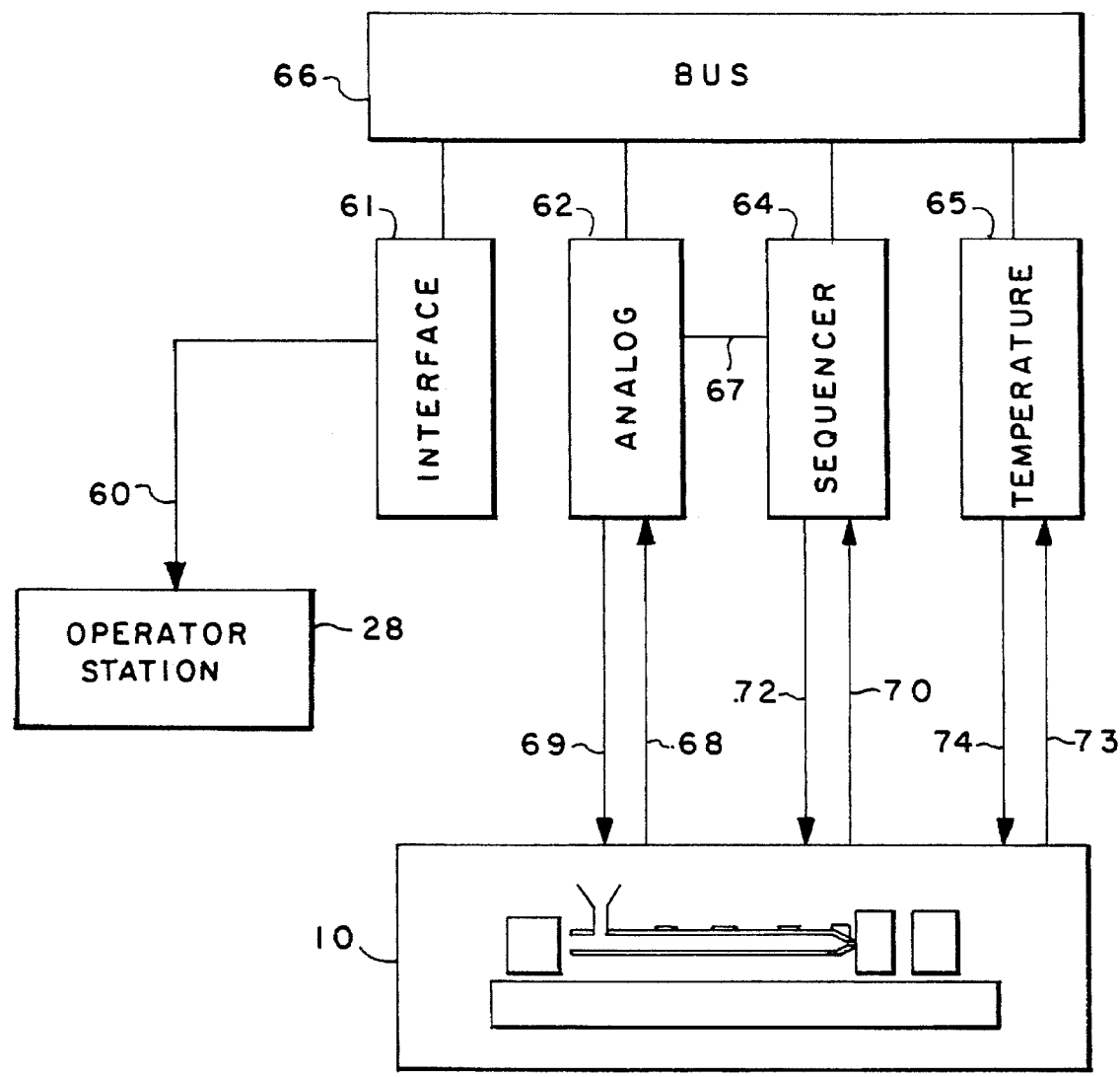
FIG. 4 is a schematic view functionally similar to FIG. 3 showing the basic control architecture of the control system of the present invention.

Referring now to FIG. 4, the basic architecture of the control system of the present invention is disclosed therein and includes operator console screen 28 where the control or set point signals are sent on input line 60 to an interface card 61. Interface card 61 is one of four cards used in the system, the other cards comprising an analog card 62, a sequence card 64 and a temperature card 65. All cards connect to one another through a backplane or buss 66. In addition, a high speed transfer link 67 connects analog card 62 with sequence card 64. Interface card 61 conventionally receives set point signals for interfacing with or transforming the signals into computer language and transmitting signals back to operator station 20 for visual display. Analog card receives analog signals on analog signal line 68 from position sensors and pressure sensors on injection molding machine 10 (generally from 0 to 10 mv) and sends output signals on analog output line 69 to various valves controlling hydraulic flow during machine operation. Sequence card 64 receives inputs from microposition limit switches such as those governing clamp position on sequence input line 70 and sends output signals on sequence output signal line 72 to hydraulic solenoids such as those controlling clamp opening and closing. Finally, temperature card 65 receives signals from thermocouples 26 on temperature input signal line 73 and transmits heater band signal or duty cycle signal on heater band output line 74.

Figure 2:
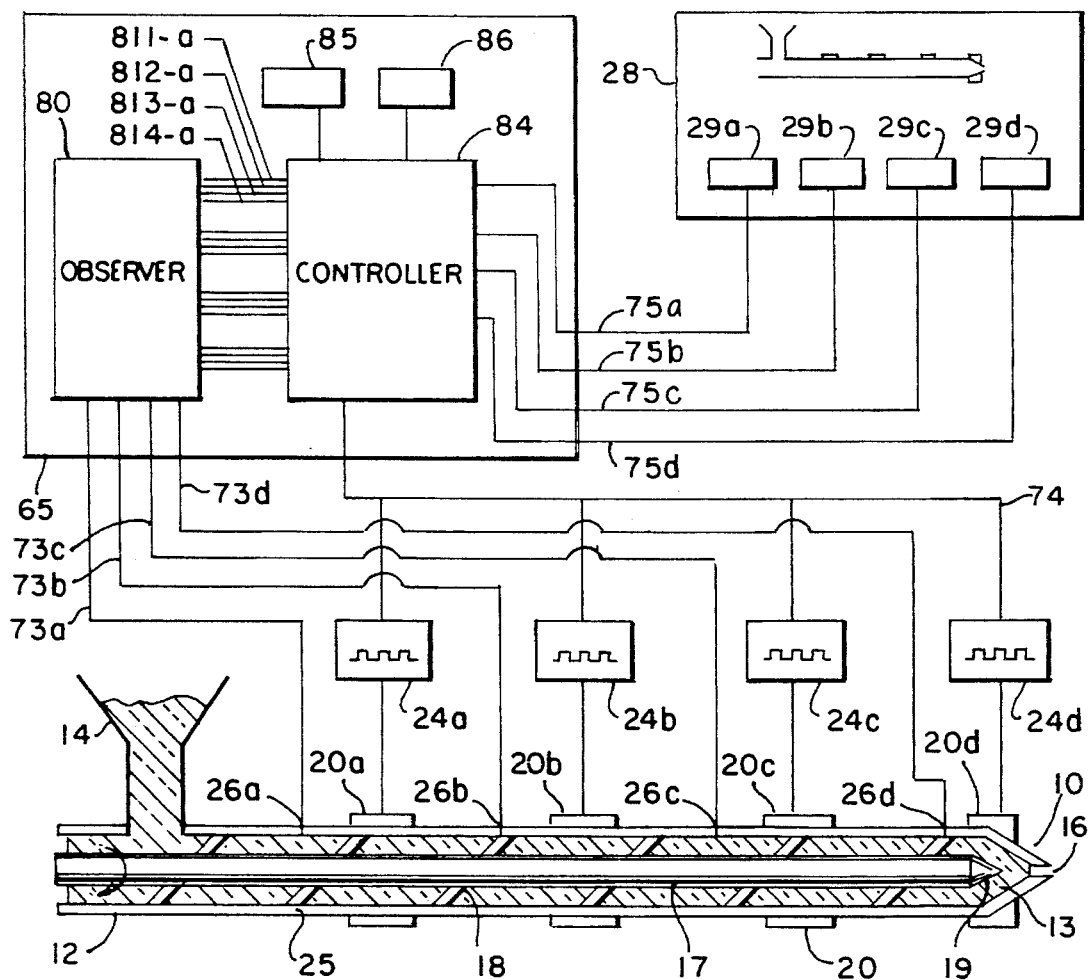
FIG. 2 is a schematic view similar to FIG. 1 but showing the control system of the present invention.

The general arrangement is diagrammatically shown in FIG. 2 and includes operator console screen 28 having set point signals 29 for dialing in desired temperatures for rear, center, front and nozzle zones a, b, c and d on set point signal lines 75 a, b, c, and d (for rear, center, front, and nozzle zones a, b, c, and d respectively) which are inputted to temperature card 65 though interface card 61 and buss 66. Set point signal lines 75 can also be viewed as communicating with operator console screen 28 for display not only of the temperature sensed by thermocouples 26 but also to show the temperatures of heater band, and of top and inner layers 1, 2 and 4 for each zone a, b, c, and d. The only other external connection to temperature card 65 is the heater band output line 74 carrying the signal controlling duty cycle controllers 24a, b, c, and d.

Within temperature card 65 is an observer section or circuit 80 which receives the four thermocouple signals on lines 73a, b, c, and d and develops 16 temperatures reflected as X in the control law. That is, temperatures for each layer 1, 2, 3, and 4 of each zone a, b, c, and d are developed in observer circuit 80 and identified as temperature output signals 81 1-a, 1-b, 1-c, . . . 4c, 4d respectively in FIG. 2. Temperature output signals 81 are inputted to controller circuit 84 which contains the control law (Equation No. 12). Also, inputted to controller circuit 84 is a filtered disturbance signal (which is digitally filtered vis-a-vis impulse response filter) designated by reference numeral 85 which is designated by the term F(t) in the control law and a time gradient of the disturbance signal designated by reference numeral 86 which is represented by the term F'(t) in the control law. Also, inputted to controller circuit 84 are set point signals 75 which are represented by the term R in the control law.

Figure 5:
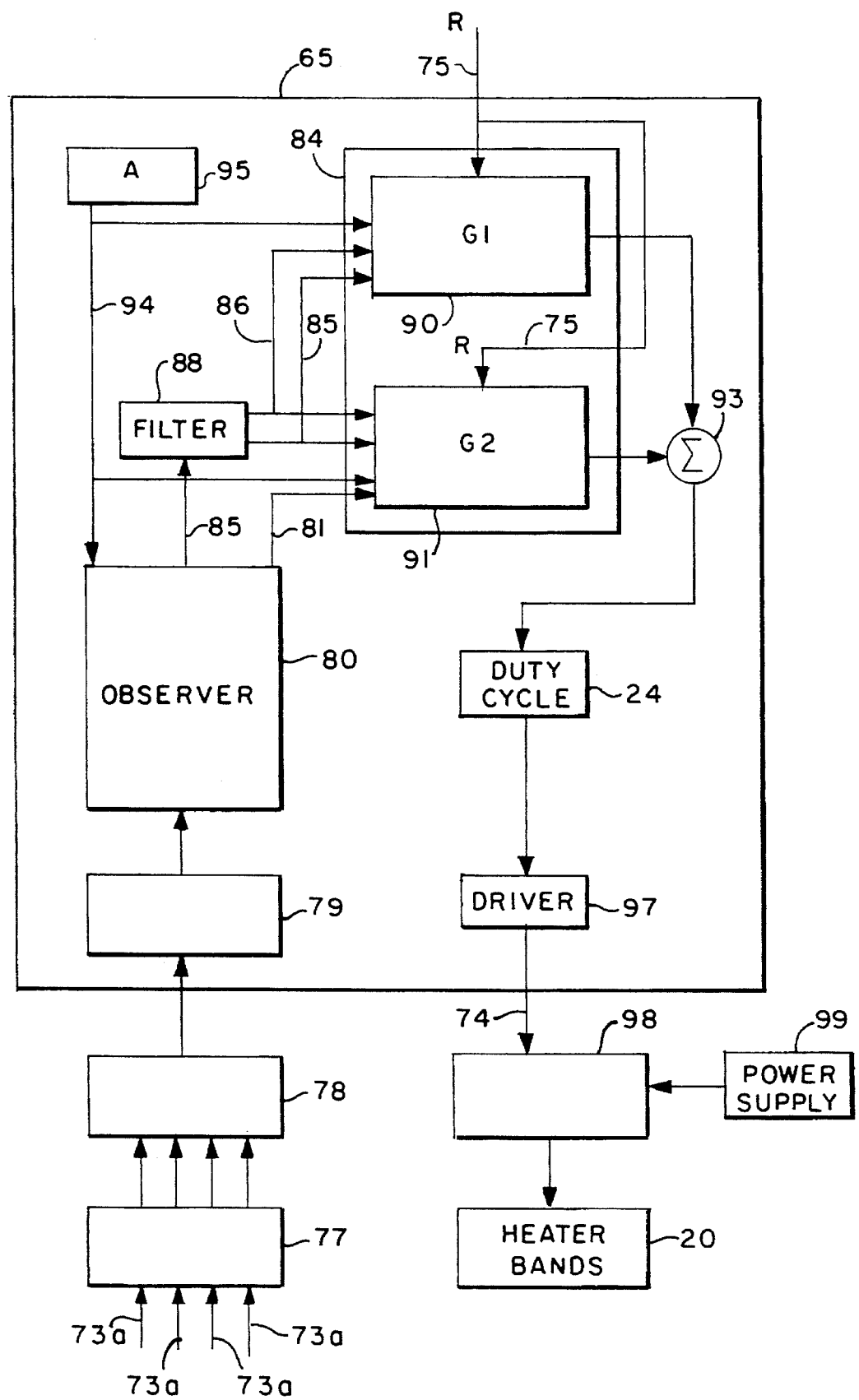
FIG. 5 is a schematic diagrammatically illustrating the principal components of the temperature card of the present invention.

Temperature control card 65 is shown in expanded form in FIG. 5. It should be clear that the entire control law is implemented by software. In the preferred embodiment the routines for the control are original code written in "C" and Motorolla 68000 assembly language whose resulting object files are part of the system level firmware designated in block form in FIGS. 2, 4 and 5. The firmware, per se, employ conventional circuits utilized by any control technician in the art and do not, in and of themselves, form the invention although the circuits are obviously the mechanism by which the invention is realized. Since the "circuits" simply use conventional circuitry well known to the technician they are merely illustrated in block form in this specification and will not be described in detail herein.

It should be sufficient to note, for example, that the four thermocouple signals on lines 73a, 73b, 73c and 73d are passed through a filter 77 which contains a conventional circuit to convert the millivolt signals to four analog temperature signals which then pass through a multiplexer 78 for sensing the signals, singularly, to an analog to digital circuit 79 (contained in temperature card 65) where the signals are digitized before passing to observer 80.

As noted in connection with the discussion in FIG. 2, observer circuit uses software and generates, through matrixes A and B the X temperature on line 81. Also the disturbance vector developed as aforesaid is applied to the calculation performed in observer 80 to develop the disturbance vector signal on line 85 which is passed through a finite impulse response filter 88 to develop a time gradient impulse on line 86 as well as a filtered disturbance on line 85. Within controller 84 are two circuits, one of which contains the $G_1$ control law term (the feed forward term) designated by reference numeral 90 and the other one of which contains the control law $G_2$ term (the error signal) designated by reference numeral 91. The signal outputs produced by G-1 and G-2 circuits 90, 91 are summed at 93 to produce a control signal on line 74 for regulating duty cycle 24. Also, inputted to both $G_1$ and $G_2$ circuits 90, 91 are set point signals on line 75 and matrix A values on line 94 which were generated during calibration and stored as battery protected calibration data as at storage circuit 95. The actual value of the G terms are chosen so as not to produce oscillations or "hunting". While temperatures are used in the control law and not in explaining the invention it should be clear that the signal generated is the energy or the heat input required from heater bands 20 to produce the desired set point temperature.

The duty cycle signal is conventionally fed to a driver circuit 97 which develops a low voltage (24 volts) analog signal fed to an opto-isolator 98. Opto-isolator 98 is basically an LED switch cycling on and off current from a power supply 99 to heater bands 20. Use of a low voltage switch such as opto-isolator 98 to regulate a high voltage power supply is a conventional technique.

A comparison of the heat up rates in tests performed on an injection molding machine equipped with the barrel temperature controller of the present invention compared with an injection molding machine equipped with a convention P.I.D. barrel temperature controller is shown in FIGS. 7a, 7b, 7c and 7d for the rear, center, front and nozzle zones, a, b, c, and d respectively. Curves designated by reference numeral 100 show the controlled barrel temperature of the middle layer 3 when using the present invention while curves designated by reference numeral 101 show the prior art control system. It should be readily apparent that the time to reach operating temperatures is significantly reduced and the over shoot is minimized. It is not unusual to see temperature overshoot of 20°–25° F. at the front nozzle with conventional control systems. The overshoot is about 3° F. with the control system of the present invention.

Figure 8:
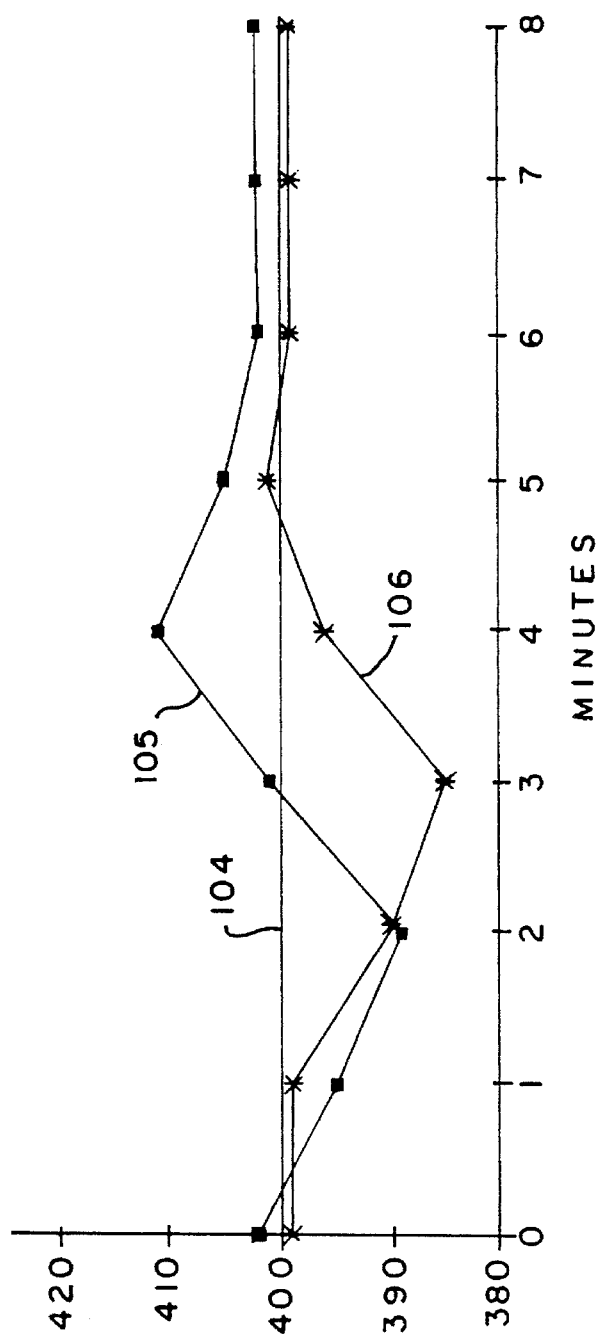
FIG. 8 is a graph showing the temperature in the nozzle zone of the barrel wall in response to a thermal disturbance within the barrel using the control system of the present invention compared to a conventional prior art control.

FIG. 8 shows another test in which the nozzle zone temperature, zone d, is recorded in response to heat disturbances within barrel 12. Set point temperature is shown by line 104. The temperature response of a P.I.D. prior art control system is shown by line 105 and the response of the control system of the invention is shown by line 106. The overshoot of the set temperature line 104 by the prior art system is significant and noticeably absent in the present invention.

In general summary, the first difference between the invention and the prior art is a fundamental one in the problem specification as stated above. The state controller is a multi in/multi out (MIMO) control technique as opposed to multiple single in/single out (SISO) loops. This provides better peak overshoot and better response to set point changes as well as allows for the capability to run a zone in closed loop even if its thermocouple fails. There are additional technical ramifications of this such as better pole placement capabilities which also allows for better disturbance response.

The state controller is a higher order system. This also improves disturbance response and when combined with the two degree of freedom control law described in the Control Law section above provides much better peek overshoot without compromising the improved disturbance response, all with no ill effect on steady state error.

Figure 11:
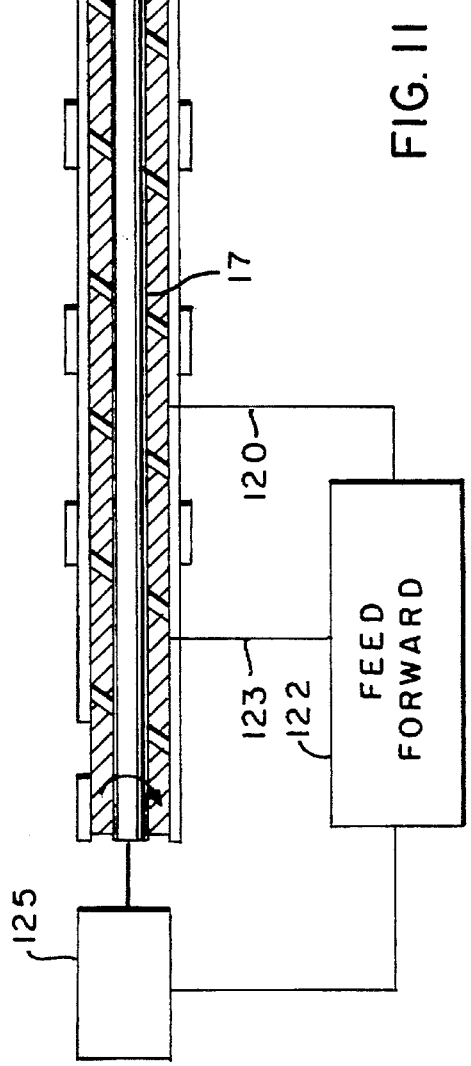
FIG. 11 is a general schematic diagram illustrating in block form a modification of the invention to better predict the shear heat distances imparted to the barrel of an injection molding machine.

The bias estimate used, being an increased order over the constant integral term of the P.I.D. allows for the prediction of the estimated disturbance into the future, thus responding to sudden disturbances, such as stopping of the molding machine, much quicker than the P.I.D. An additional important feature of the bias estimate and the techniques with which the estimate is used is extendibility. As more research is done on the mechanics of the disturbances the current model used for the bias estimate may be replaced with more complex perhaps periodic models and through the use of the already existing inner-board signaling system present in the control, the effects of logic sequencer actions (such as the rotating of the screw) could be fed forward into the bias estimate to completely eliminate all predictable disturbances. Although this would require adaptive methods for determining the magnitude of these effects, the control law would remain identical, with F(t) generated by the new disturbance prediction. A P.I.D. loop is not extendible. This variation in the controller is schematically illustrated in FIG. 11. In its simplest form, the temperature of plastic melt 13 is sensed as by a thermocouple(s) 120. Those readings are sent to feed forward state controller 122 which uses linear predictive coefficients or coding to develop a predictive temperature signal schematically, which is shown schematically inputted on line 123 as heat inputted to inner layer 4, and in fact, constitutes the disturbance vector F(t). Feed forward state controller 122, being predictive, would be a better estimator than the disturbance vector described above. However, feed forward state controller 122 would still have to wait for some event, i.e., temperature, to occur in plastic melt 13 and be sensed by melt thermocouple 120. A better approach utilizes the knowledge that shear heat results from the rotational speed (and rearward travel) of ram screw 17. Further, this rotational speed producing shear heat is in turn controlled by another portion of any injection molding machine control system diagrammatically shown as speed controller 125 in FIG. 11. By "tapping" speed controller 125, feed forward state controller 122 can, by using simple predictive linear coding techniques, estimate the shear heat which will result and program or factor on line 123 this heat as the disturbance.

The parametric curve fitting used for system identification has advantages over other possible auto-tuning techniques in that a priori knowledge is used to the fullest and only the variable sub-space of the large arrays need be determined, thus improving the accuracy of the system identification. The test sequence applied is designed to provide large amounts of "persistent excitation" for these variable parameters. For example, a rather long "cooling only" period is in the test sequence for accurate determination of the rather small atmospheric loss coefficient which would otherwise almost certainly be obscured due to the conduction heat loss.

The invention has been described with reference to a preferred embodiment. Obviously, modification and alterations will occur to those skilled in the art upon reading and understanding the invention. For example, alternatives to the state control formulation of the problem might include higher order SISO formulations with adaptive auto-tuning. These techniques would not however fully utilize knowledge of the structure of the problem. Other alternatives might involve variations of which state variables are used and the number of layers selected. The three layer plus heater band approach was chosen in order to sufficiently model the observed data. However, more layers or perhaps a more "closed form" model based on the partial derivatives of a more accurate formulation of heat transfer within a cylinder could be used. It must be recognized though, that the increased complexity of the model and thus the increase in required processor time, especially when used for the convolution of the disturbance model, may make this inappropriate. Other improvements to the state control could include a more "optimal" control law such as would be given by Linear Quadratic Gaussian Control. This however is not so much a different control technique as a refinement of the state control theory. Other changes outside of the control law could also be used to improve control. This might include the use of proportional heating bands, better heater bands themselves, or even totally new ways of heating the plastic might be considered. In any of these cases a control law based on modern state control techniques and utilizing all available information on the process will result in the best performing temperature control system and thus the best value to machine users. Finally, the system disclosed can be employed in extrusion and die casting machines. It is intended to include all such modifications and alterations insofar as they come within the scope of the present invention.

Having thus defined the invention it is claimed:

1. A process automatically controlling the duty cycle for the heater bands of an injection molding machine so that the barrel temperature is reached and maintained at an operator inputted set point temperature, said molding machine having at least three electrical heater bands, each band extending about the cylindrical barrel of said machine and longitudinally-extending side-by-side along the barrel between the machine's hopper and nozzle and dividing said barrel into at least three longitudinally-extending zones, each zone associated with a heater band, said process comprising the steps of:

a) dividing each zone into four radially extending layers including a heater band layer radially extending through said heater band, an outer surface layer radially extending from the outer surface of said barrel a fixed radial inward distance, an inner surface layer radially extending from the inner surface of said barrel a fixed radial outward distance and a middle layer in-between and contiguous with said outer and inner layers, said middle layer indicative of the temperature of said barrel;

b) determining the future temperature of said middle layer at the end of a first discrete time period in the future by simultaneously calculating the heat transferred from and to each layer in each zone by all other layers in all other zones during said first future time period; and c) adjusting the duty cycle for each zone by developing a duty cycle control signal correlated to the heat input required from said heater bands to reduce the deviation between said future temperature determined in accordance with step (b) and said set point temperature to zero.

2. The process of claim 1 further including the step of providing a thermocouple to sense the temperature of said middle layer of each zone and performing step (b) by calculating the future temperature resulting from the heat transferred between all layers using the sensed temperature of said middle layer to establish the current temperature of all said layers.

3. The process of claim 1 further including the step of estimating the current temperature of each middle layer from the specific duty cycle in use for each zone and performing step (b) by calculating the future temperature resulting from the heat transferred between all layers using the estimated temperature of said middle layer from heat transfer from the heater band layer to establish the current temperature of all said layers whereby said process is effective to control the barrel temperature in an open loop manner should there be a thermocouple failure.

4. The process of claim 1 wherein the heat transferred with respect to any given layer is calculated only for layers which are immediately adjacent one another with any further removed layer assigned a zero value whereby the processing time is minimized to insure a responsive control process.

5. The process of claim 1 further including the additional step of determining the future peak temperature of each middle layer occurring during a second future discrete time period longer than said first time period by simultaneously calculating the heat transferred between all layers during said second time period without considering any heat imparted to the middle layers attributed to said heater bands and adding the heat energy required to produce said future temperature with the heat energy required to maintain said future peak temperature to produce a final temperature signal and adjusting the duty cycle for each zone to reduce the deviation between said final future temperature and said set point temperature to zero.

6. The process of claim 1 wherein said heat transfer with respect to said inner, middle and outer layers is determined in accordance with Fourier's Law of Heat Conduction and said heat transfer with respect to said heat band layers is determined in accordance with Newton's Law of Cooling.

7. The process of claim 1 further including the steps of actually sensing the temperature of the middle layers by a thermocouple and performing a calibration step of cyclically applying the heater bands for known time periods and known power levels while recording the temperature of the middle layer predicted by step (b) using hypothetical heat transfer co-efficients; comparing the recorded temperatures to known thermocouple temperatures and adjusting the values of said hypothetical co-efficients to produce temperatures by application of step (b) equal to said known temperatures.

8. The process of claim 7 wherein said adjustment of said heat transfer co-efficient includes utilization of a multidimensional curve fitting algorithm.

9. The process of claim 8 wherein said calibration step also corrects other process parameters including the heater band energy of each band and the atmospheric heat transfer co-efficients.

10. The process of claim 1 further including the step of adjusting the temperature calculated in step (b) by a time-weighted disturbance temperature value to account for shear heat from the plastic in the center and front of the barrel and conduction of heat away from the plastic in the rear of the barrel.

11. The process of claim 10 wherein said disturbance temperature value is determined during calibration by an observer technique.

12. The process of claim 11 wherein said disturbance temperature is determined by sensing the actual temperature recorded by said middle layer and comparing the actual temperature with the predicted temperature of step (b) and adjusting the temperature predicted for the inner zone layer temperature to a temperature value which results in the predicted temperature in step (b) equalling said actual temperature.

13. The process of claim 5 further including the step of adjusting the temperature calculated in step (b) by a time-weighted disturbance temperature value to account for shear heat from the plastic in the center and front of the barrel and conduction of heat away from the plastic in the rear of the barrel.

14. The process of claim 13 wherein said future temperature and said future peak temperature is determined with said load disturbance value added to said temperatures.

15. A process for controlling the duty cycle of the heater bands of a plasticating machine using a state controller for effecting feed forward control of the heater bands, said plasticating machine having a plurality of heating bands extending about the outside surface of the barrel of said machine between the machine's hopper and injection nozzle, and dividing said barrel into a plurality of longitudinally-extending zones, each co-incident with a heater band and having a plurality of radial layers extending from the outside surface of said barrel adjacent said heater band to the inside surface of said barrel adjacent said plastic material and including a middle layer situated at about the center of the barrel wall, said process comprising the steps of a) calculating the heat transfer from any one radial layer to an immediately adjacent layer for all layers in all zones to determine the future temperature of each middle layer in each zone at a discrete future time period;

b) comparing the future temperature to a set point temperature;

c) generating from the difference in said future temperature with said set point a separate control signal indicative of the heat needed for each heater band to produce a future temperature equal to said set point temperature; and d) controlling the duty cycle by said separate control signals.

16. The process of claim 15 further including within step a) the additional step of adding to the heat transfer calculation for the layer adjacent the inside surface of said barrel a time gradient factor indicative of thermal disturbances of the plastic melt within said barrel.

17. The process of claim 16 further including in step c) determining the amount of additional heat needed by performing step a) to maintain said future temperature at said set point temperature for a second discrete future time period longer than said first time period but without adding any heat transferred to said barrel from said heater bands and generating said separate control signal to be indicative of the heat needed to reach said set point temperature and the additional heat needed to maintain said set point temperature and the additional heat needed to maintain said set point temperature.

18. The process of claim 17 further including the step of calibrating the machine by activating the heater bands for discrete time periods at predetermined energy levels and comparing the temperature obtained from step a) with known temperature values to obtain machine specific heat transfer co-efficients values which are utilized to determine heat transfer between layers in step a).

19. In an injection molding machine having a barrel, an injection screw within said barrel, a nozzle opening at one end of said barrel, a plastic feed hopper in fluid communication with the interior of said barrel spaced from said nozzle opening; a plurality of heater bands, each band extending around said barrel and longitudinally spaced along said barrel between said nozzle opening and said feed opening to define a plurality of longitudinally-extending zones equal in number to said heater bands; means to set the temperature of each band to equal a set point temperature, the improvement comprising:

a) a thermocouple positioned in the barrel wall at each zone for developing a signal indicative of the barrel wall temperature for each zone;

b) means to generate for each thermocouple signal a set of four additional temperature signals indicative of the temperature within the outside surface layer of said barrel, the temperature within the inside surface layer of said barrel, the temperature within the heater element layer surrounding said band, and the temperature within the barrel wall mid-point layer by simultaneously calculating the heat transferred between any adjacent layer within a given zone and any adjacent layer within an adjacent layer within an adjacent zone at any given time;

c) means to generate for each zone a single predictive temperature signal indicative of the barrel wall temperature of each zone occurring over a discrete period of time in the future;

d) means comparing said predictive temperature signal with said set point temperature and generating a temperature command signal indicative of the heat required be each heater band to cause said predictive temperature to equal said set point temperature; and e) means for setting the temperature of each heating band using said predictive command signal.

20. The improvement of claim 19 further including a buffer for storing a time-gradient signal indicative of temperature effects of heat disturbances and said means to generate said prediction temperature signal for setting said heater band temperature applying said time-gradient disturbance signal to said barrel temperature signal to produce a signal controlling each heater band.

21. A method for controlling the temperature of the plastic melt within the barrel of a plasticating molding machine; said molding machine having a plurality of heater bands circumscribing said barrel at spaced increments extending from the barrel nozzle to the feed hopper and dividing said barrel into a plurality of heat zones, a controller for regulating the temperature of said heat bands in response to a control signal; and an operator console for setting a desired temperature signal for each of said zones; said method comprising the steps of:

a) sensing the actual temperature in the wall of said barrel for each zone to develop a barrel wall temperature signal therefrom, each zone having a set of signals including a middle wall layer temperature signal, an inside wall layer temperature signal, an outside wall layer temperature signal and a heater band layer signal; and from said barrel wall signal developing a calculated inside barrel wall signal, a calculated outside barrel wall signal, a calculated middle wall signal and a calculated heater band signal, each wall signal indicative of heat transferred from and to adjacent wall layers occurring over some future discrete time period;

b) developing for each zone a middle wall command signal from all the signals in the set for said one particular zone and all the signals in the sets for zones adjacent to said one particular zone; and c) controlling the temperature of said heater band for said any one zone by applying said middle wall control signal to said heater band.

* * * * *

UNITED STATES PATENT AND TRADEMARK OFFICE
CERTIFICATE OF CORRECTION

PATENT NO. : 5,456,870
DATED : October 10, 1995
INVENTOR(S) : Thomas C. Bulgrin

Page 1 of 2

It is certified that error appears in the above-indentified patent and that said Letters Patent is hereby corrected as shown below:

Claim 19, Column 24, Line 38, change "be each heater ..." to "by each heater ...".

Column 6, line 22, change "molded parts" to "molded parts."; Column 7, line 49 change "system, and" to "system; and"; Column 8, line 52 change "duty cycle controller ..." to "duty cycle controllers..."; Column 10, lines 37-38, change "is the heat II ! 1 II II generated ..." to "is the heat generated ...";
Column 13, line 31, change "The G1 term may be ..." to "The $G_1$ term may be ...";

Column 13, lines 40-47, change the formula $$U(t) = G_1 \cdot (R - (A^{10} \cdot R + \sum_{i=1}^{10} A^{10-i} \cdot (F(t) + i \cdot F(t))) \quad (12)$$

$$+ G_2 \cdot (R - A^s \cdot (X(t) + \sum_{i=1}^{s} A^{s-i} \cdot (F(t) + i \cdot F(t)))$$

UNITED STATES PATENT AND TRADEMARK OFFICE
CERTIFICATE OF CORRECTION

PATENT NO. : 5,456,870
DATED : October 10, 1995
INVENTOR(S) : Thomas C. Bulgrin

It is certified that error appears in the above-indentified patent and that said Letters Patent is hereby corrected as shown below:

to accurately reflect the term $F^1$, second occurrence in both lines as follows:

$$U(t) = G_1 \cdot (R - (A^{10} \cdot R + \sum_{i=1}^{10} A^{10-i} \cdot (F(t) + i \cdot F'(t))) \quad (12)$$

$$+ G_2 \cdot (R - A^s \cdot (X(t) + \sum_{i=1}^{s} A^{s-i} \cdot (F(t) + i \cdot F'(t)))$$

Column 15, line 28, change "layer a-1 as X, rear ..." to "layer a-1 as $X_1$, rear ...";

Signed and Sealed this

Twelfth Day of March, 1996

Attest:

BRUCE LEHMAN

*Attesting Officer*       *Commissioner of Patents and Trademarks*